(12) United States Patent
Gunyakti et al.

(10) Patent No.: US 7,356,709 B2
(45) Date of Patent: Apr. 8, 2008

(54) SYSTEMS AND METHODS FOR DETERRING SOFTWARE PIRACY IN A VOLUME LICENSE ENVIRONMENT

(75) Inventors: Caglar Gunyakti, Sammamish, WA (US); Kristjan E. Hatlelid, Sammamish, WA (US); Ning Zhang, Sammamish, WA (US); Xiaoxi Tan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 10/356,225

(22) Filed: Jan. 31, 2003

(65) Prior Publication Data

US 2004/0153658 A1    Aug. 5, 2004

(51) Int. Cl.
H04F 11/30 (2006.01)
H04K 1/00 (2006.01)
G06F 15/16 (2006.01)
G06F 11/30 (2006.01)
G06F 7/04 (2006.01)

(52) U.S. Cl. .................. 713/193; 705/59; 709/229; 713/190; 726/31

(58) Field of Classification Search ................ 713/193; 705/59; 709/229; 726/31
See application file for complete search history.

(56) References Cited

U.S. PATENT DOCUMENTS

| 5,138,712 A | * | 8/1992 | Corbin .................. 726/30 |
| 5,204,897 A | * | 4/1993 | Wyman .................. 710/200 |
| 5,260,999 A | * | 11/1993 | Wyman .................. 705/59 |
| 5,319,705 A | * | 6/1994 | Halter et al. .................. 705/54 |
| 5,553,139 A | * | 9/1996 | Ross et al. .................. 705/59 |
| 5,754,763 A | * | 5/1998 | Bereiter .................. 726/28 |

(Continued)

FOREIGN PATENT DOCUMENTS

WO    WO 00/75760 A1    12/2000

OTHER PUBLICATIONS

Musich, P. "MSPs Make Big Deals- As Customers' Needs Change, Small Companies License Software, Team with Larger Vendors", *EWEEK*, 2002, 19(26) (Jul. 1) 23.

(Continued)

*Primary Examiner*—Emmanuel L. Moise
*Assistant Examiner*—Techane J. Gergiso
(74) *Attorney, Agent, or Firm*—Woodcock Washburn LLP (57) ABSTRACT

A unique volume license key (VLK) is provided to a volume license holder. A signed file containing the VLK and the data derived from volume license holder's submitted computing environment information is provided to the volume license holder along with the licensed software. The license file is stored in a central location, such as on an installation server, or locally on client machines, in a rather large file of any type. Upon logon, the license file is read, the data authenticated and the system is activated. If license data cannot be authenticated, a connected system either fully functions in grace period or run in reduced functionality mode until authentication succeeds. If the system is disconnected, the system is functional only with disconnected features until it joins a network again. In a completely off-line installation, the license file is generated by the volume license holder using software vendor assigned specific VLK and software vendor provided security hardware device. The distribution methods of software package, the VLK, and the license file can be flexible, including, but not limited to, single or multiple media.

33 Claims, 4 Drawing Sheets

Note: dashed lines represent alternatives

U.S. PATENT DOCUMENTS

| | | | |
|---|---|---|---|
| 5,905,860 A * | 5/1999 | Olsen et al. | 726/27 |
| 6,006,035 A | 12/1999 | Nabahi et al. | 395/712 |
| 6,059,838 A * | 5/2000 | Fraley et al. | 717/108 |
| 6,108,420 A * | 8/2000 | Larose et al. | 705/59 |
| 6,134,324 A * | 10/2000 | Bohannon et al. | 705/52 |
| 6,134,659 A | 10/2000 | Sprong et al. | 713/190 |
| 6,223,288 B1 * | 4/2001 | Byrne | 713/190 |
| 6,226,747 B1 * | 5/2001 | Larsson et al. | 726/31 |
| 6,263,492 B1 * | 7/2001 | Fraley et al. | 717/107 |
| 6,799,277 B2 * | 9/2004 | Colvin | 726/22 |
| 6,842,896 B1 * | 1/2005 | Redding et al. | 717/172 |
| 7,024,696 B1 * | 4/2006 | Bahar | 726/26 |
| 2001/0034712 A1 * | 10/2001 | Colvin | 705/52 |
| 2002/0016846 A1 * | 2/2002 | Ono | 709/229 |
| 2003/0050895 A1 * | 3/2003 | Dedrick et al. | 705/59 |
| 2003/0088516 A1 * | 5/2003 | Remer et al. | 705/59 |
| 2003/0156719 A1 * | 8/2003 | Cronce | 380/256 |

OTHER PUBLICATIONS

Schulz, N. "E-Journal Databases: A Long-Term Solution?", *Library Collections Acquisitions & Technical Services*, 2001, 25(4), 449-459.

Kang, W.J. et al., "Dynamic License Control System for an On-line Circulation of Digital Product in Electronic Commerce", *Proceedings of the IASTED International Conference. Internet and Multimedia Systems and Applications*, 2000, 140-144.

* cited by examiner

FIG. 1

Note: dashed lines represent alternatives

Fig. 2

Note: dashed lines represent alternatives

SYSTEMS AND METHODS FOR DETERRING SOFTWARE PIRACY IN A VOLUME LICENSE ENVIRONMENT

FIELD OF THE INVENTION

This invention relates to the field of software piracy deterrence and in particular to the field of volume licensing of software using a volume license key (VLK).

BACKGROUND OF THE INVENTION

Software piracy is a worldwide problem that costs software vendors huge sums of money every year. One form of piracy known as casual copying is sharing and installing software on multiple computers, in violation of the end user license agreement. Product activation is one way to reduce this type of piracy.

Product activation commonly relies on the submission of an installation identification code and/or a hardware identifier to the software vendor. The software vendor in response returns an activation confirmation code. In one type of product activation, a unique product key is provided with each package of boxed software. Typically, after some grace period, (a period of time after installation of software during which the software will run without being activated), a customer must contact the software vendor to activate his copy of the software. Failure to do so frequently results in inactivation of the software or in degraded functionality of the software. Typically the unique product key is used to generate a unique product identification code, which may be combined with a hashed hardware-related value to generate an installation identification code that is specific to the machine the software runs on. An activation confirmation that enables the software to run is typically returned to the customer. In this regard, an activation confirmation can also be a license file, or a binary that represents a license. At each login the licensed software checks to see that it is running on essentially the same hardware it was activated on. If the check fails, reactivation is required before the software will run again.

Corporate customers commonly purchase a volume license. It is not feasible for corporate customers who may have hundreds or thousands of machines in their domain to contact the software vendor for each software copy installed to receive a machine-specific activation code. Typically, therefore, holders of volume licenses do not have to contact the software vendor to activate their software, because the software bypasses the activation requirement when a volume license key is detected. Hence, the same volume license key can be used on many different computers, none of which require activation in order for the software to run, before or after the grace period has expired. This handy feature of the volume license key makes it an attractive target for piracy.

It would be helpful if there were a way to make pirating of volume license keys more difficult.

SUMMARY OF THE INVENTION

A software-vendor-signed file containing an enterprise-specific VLK, a license ID, network environment binding hashes, and any policy data is provided to the volume license holder along with the licensed software. This enterprise-specific license file can be stored in central servers, such as on an installation server, or it can be stored on the local machine as well. The enterprise-specific license file can be rather large (e.g., over 1.44 MB so that the file will not fit on a floppy disk. In one embodiment, an unattended installation script can refer to the enterprise-specific VLK license file or VLK license file can be deployed after or during install process via some other method (e.g. manual or automated file copy operation). The script contains the locations of the enterprise-specific license file. Upon logon, the enterprise-specific license file is read, the data authenticated and the software is activated. If the software system is not able to verify the license data while network-connected, the software will continue to be fully functional within a grace period, beyond which the software will function in reduced functionality mode or the user may request a signed extension from the software vendor. If the environment binding cannot be verified while the machine is disconnected from the network, the system will continue to be functional only with disconnected features until it is re-joined to a network. The grace period flag is marked in a location unique to each operating system (OS) installation on which the software is installed. The flag can be validated through the software.

If an enterprise cannot obtain a signed VLK license file from the software vendor, the enterprise may generate the license file using a software vendor supplied hardware device, e.g. a smartcard. By generating the license file itself without having to submit characteristics of its computing environment to the software vendor, the enterprise need not compromise the security characteristics of its computing environment.

DETAILED DESCRIPTION OF ILLUSTRATIVE EMBODIMENTS

Exemplary Computing Environment

Figure 1:
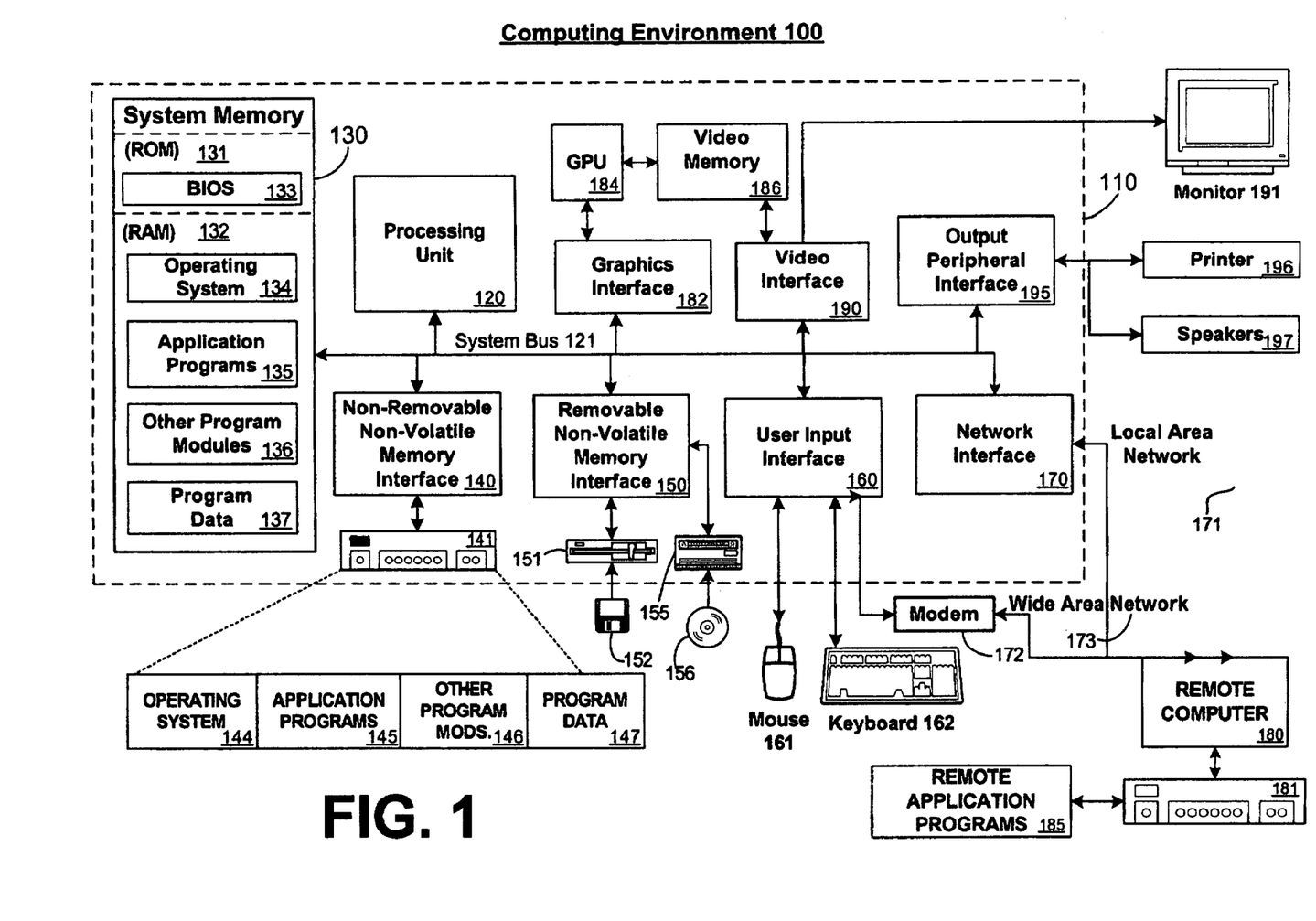
FIG. 1 is an exemplary computing environment in which aspects of the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Systems and Methods for Deterring Software Piracy

Figure 2:
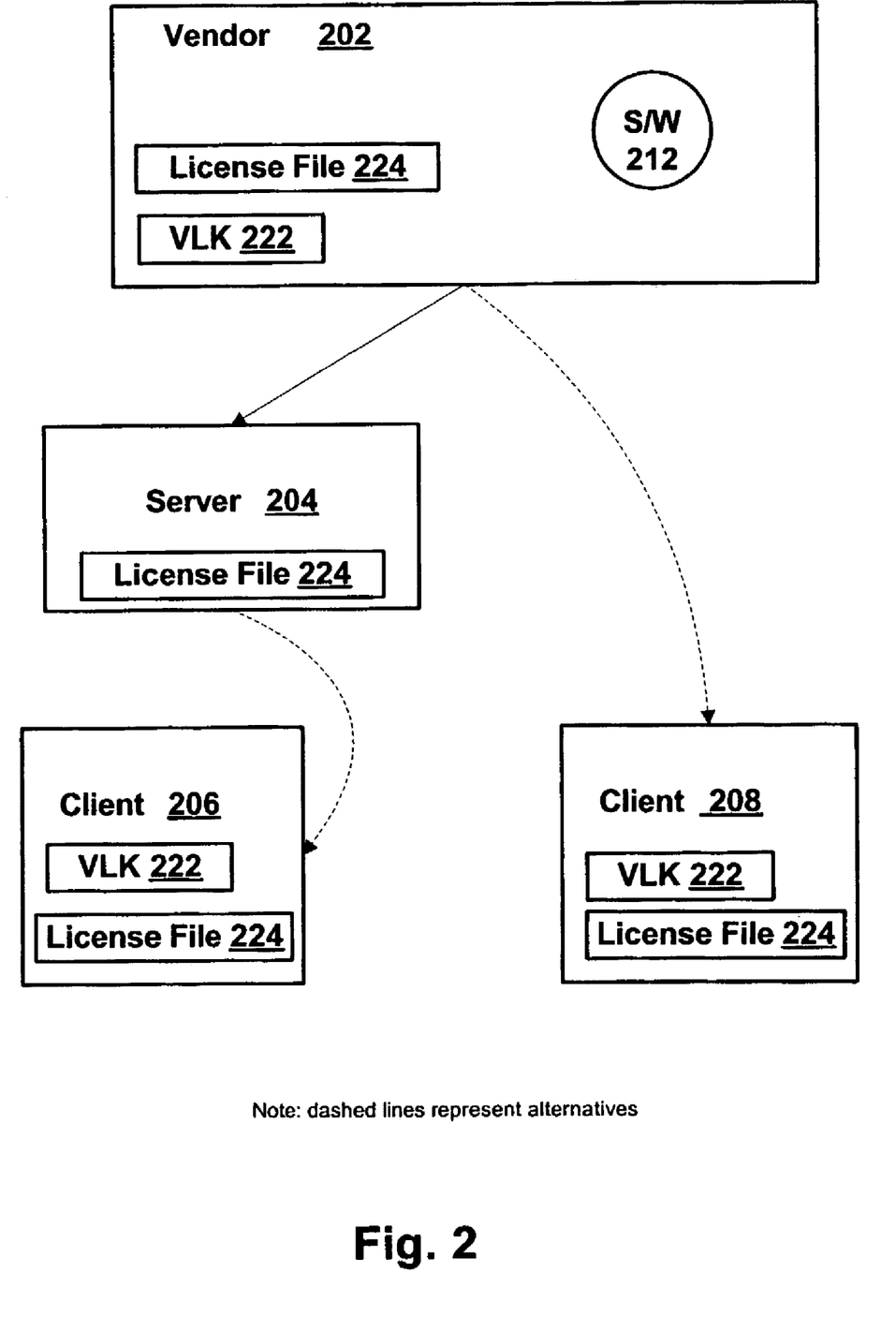
FIG. 2 is a block diagram illustrating an exemplary environment-binding-enforced system for deterring software piracy in accordance with one embodiment of the present invention.

FIG. 2 is a block diagram of a system of environment-binding-enforced distribution for deterring piracy of software in accordance with one embodiment of the invention. Server 204 or vendor 202 may be connected to one or more clients 206 or 208 via a network such as a WAN, LAN (wired or wireless), intranet, the Internet, or other suitable network. In FIG. 2, the dotted lines illustrate alternate implementations of the invention, illustrating that server 204 is optional since its role is for initial license file discovery and is not required for implementing the invention.

A software vendor may provide a volume license holder a copy of volume licensed software 212 on some media such as, but not limited to, a CD ROM. Accompanying the software 212 may be an enterprise-specific or volume-license-holder-specific VLK 222. In one embodiment of the invention, the VLK 222 is embedded within a relatively large file, called the license file 224. The license file 224 may be constructed based upon, for example, an identification for the company and products that are licensed to the company, and may include environmental binding information like hashes of the names of domain controllers (DCs), active directories (ADs), etc. In an exemplary embodiment, the license file is a relatively large file system file. The particular file type selected may be any type of file type, including, but not limited to image or audio file formats. VLK 222 may be embedded anywhere in the data, which in one embodiment is then signed with a private key to generate the license file 224. In one embodiment of the invention, the size of the license file 224 is greater than 1.44 Megabytes (MB), such as, for example, 2 MB, to prevent copying the license file 224 onto a floppy disk. In one embodiment of the invention, the license file 224 is provided on a CD ROM containing only the license file 224 and having a volume label different from the volume label of the CD ROM containing the associated software 212.

In the above-described environment in which the license holder's software 212 is distributed among clients 206, 208, etc. At logon, an activation code resident on client machines 206, 208, etc. reads the content of the license file 224 to verify that the license file 224 has not been tampered with. As utilized herein, activation refers to a process for validating software license data, network environment binding and enabling the software to be functional within a period of time without further binding validation. In this regard, during the software installation process, VLK 222 and/or license file 224 can be transmitted to clients 208, or to clients 206, e.g., via server 204. The verification process includes checking the license on the local machine against the binding or policy defined in the license. It is optional to receive the license file from the server location.

The integrity of license file 224 can be verified by checking the signature of the file. If the license file 224 has not been tampered with, i.e., if the integrity is verified, the software is allowed to run. If the license file 224 has been tampered with, the software will run in a reduced functionality mode.

Large scale deployments of software are typically too costly and time-consuming for an administrator to personally set up large numbers of machines. In addition, administrators often do not want end users to personally activate their machines. Hence, such installations are therefore usually automated, using unattended or remote processes.

Activation of volume licensed software can be performed during setup or can be performed at a later time. An unattended answer file is a text file that is used in conjunction with a software setup routine to bypass normal setup prompts. An unattended file can, for example, enter a VLK automatically, configure proxy settings and auto-activate the system on behalf of the end user, either through the target machine's local area network (LAN) or via the Internet. Activation can also be performed after setup using command-line scripts.

When installing the volume licensed software on clients 206, 208, etc. an installation image may be prepared with the aid of an unattended file. The unattended file is a specialized script that performs the unattended installation. The software 212 is installed on the client machines 206, 208, etc. by executing the script. The script sets the location of the license file 224 to a list of known locations, including server 204. Alternatively, the license file 224 may be copied onto the client machines if the file is part of the installation image. Upon logon, the license file 224 is read, the data authenticated and the client machines 206, 208, etc, are activated. If the environment characteristics specified in the license file 224 cannot be verified while the system is connected, the system will continue to function in the grace period. Beyond the grace period, the system may function in the reduced functionality mode or the end user may request an extension from software vendor 202. If the license data cannot be verified while the system is disconnected, the software will continue to be functional only with disconnected features until the system joins a network again.

In various embodiments, when in the grace period and there is network connectivity, but the system of the invention cannot validate the environment, the system can contact a central location that can check for leakage and grant an additional term of grace period. For example, a hash of license file and HWID could be transmitted to the central location, and a server can check the hash against a black list, and then send down to the client location a signed license with a perpetual date.

In this regard, in one embodiment, if the VLK file check fails, the result is failure. In another embodiment, if the VLK file check fails, the VLK license file can be parsed, and then a search may be made of various listed servers for a new license file.

In a black-op scenario, an enterprise cannot obtain a license from the software vendor in connection with the VLK environment. Thus, in one embodiment, in the black-op case, the enterprise can generate its own license file signed by piece(s) of hardware that are issued by the software vendor.

Figure 3:
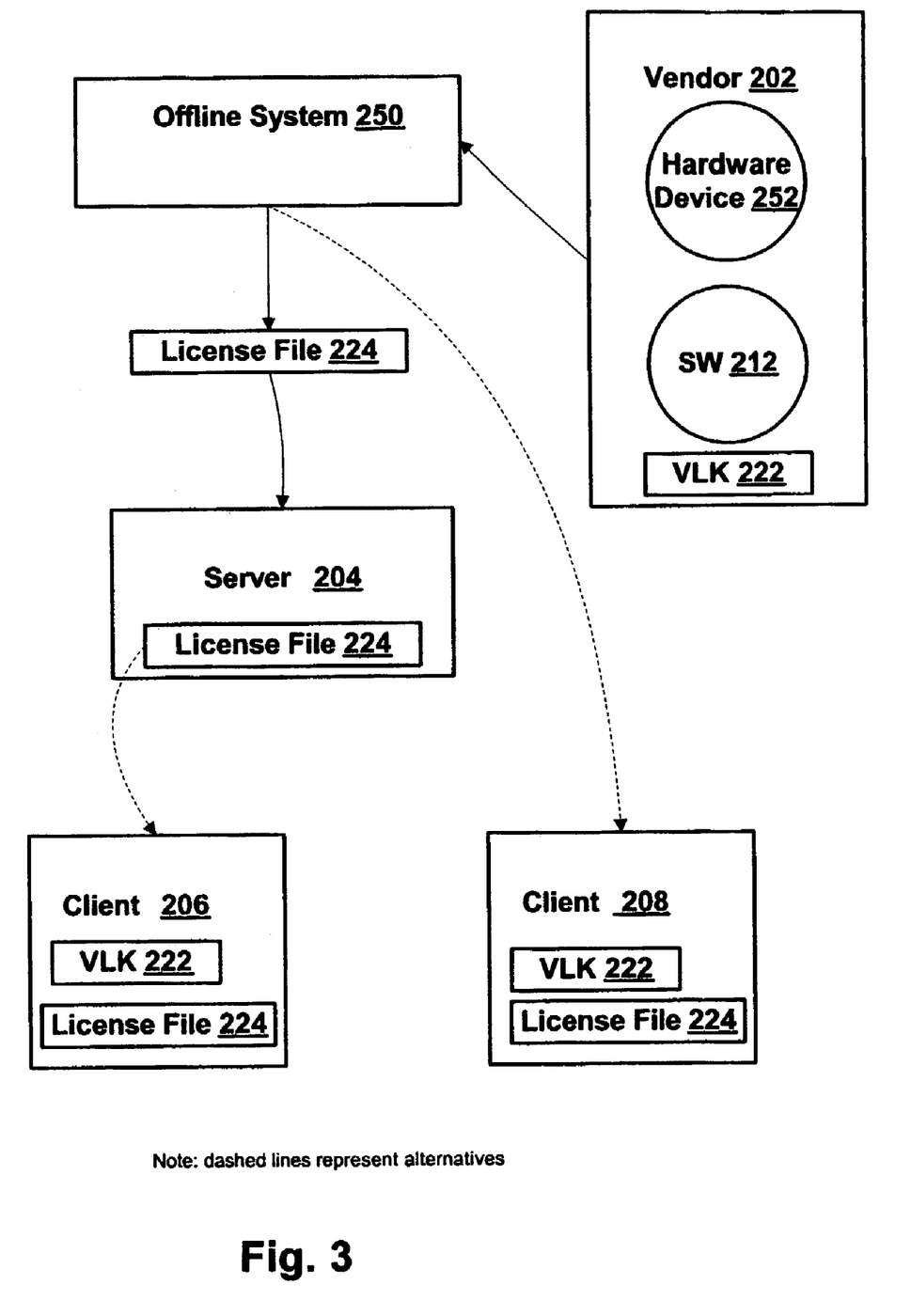
FIG. 3 is a block diagram illustrating an exemplary off-line system for deterring software piracy in accordance with one embodiment of the present invention.

FIG. 3 is a block diagram of an enterprise off-line system 250 for deterring software piracy in accordance with one embodiment of the invention. In the off-line system, an enterprise receives the VLK 222 and the software vendor 202 supplied security hardware device 252. The hardware device 252 is capable of performing signing operations to generate license file 225 which is identical to license file 224 in format. The installation of the volume licensed software on client machines 206 and 208, the activation process, and the license validation procedure are the same as described in FIG. 2 in which the VLK license file is signed and also from the software vendor. As with FIG. 2, in FIG. 3, the dotted lines illustrate alternate implementations of the invention.

Figure 4:
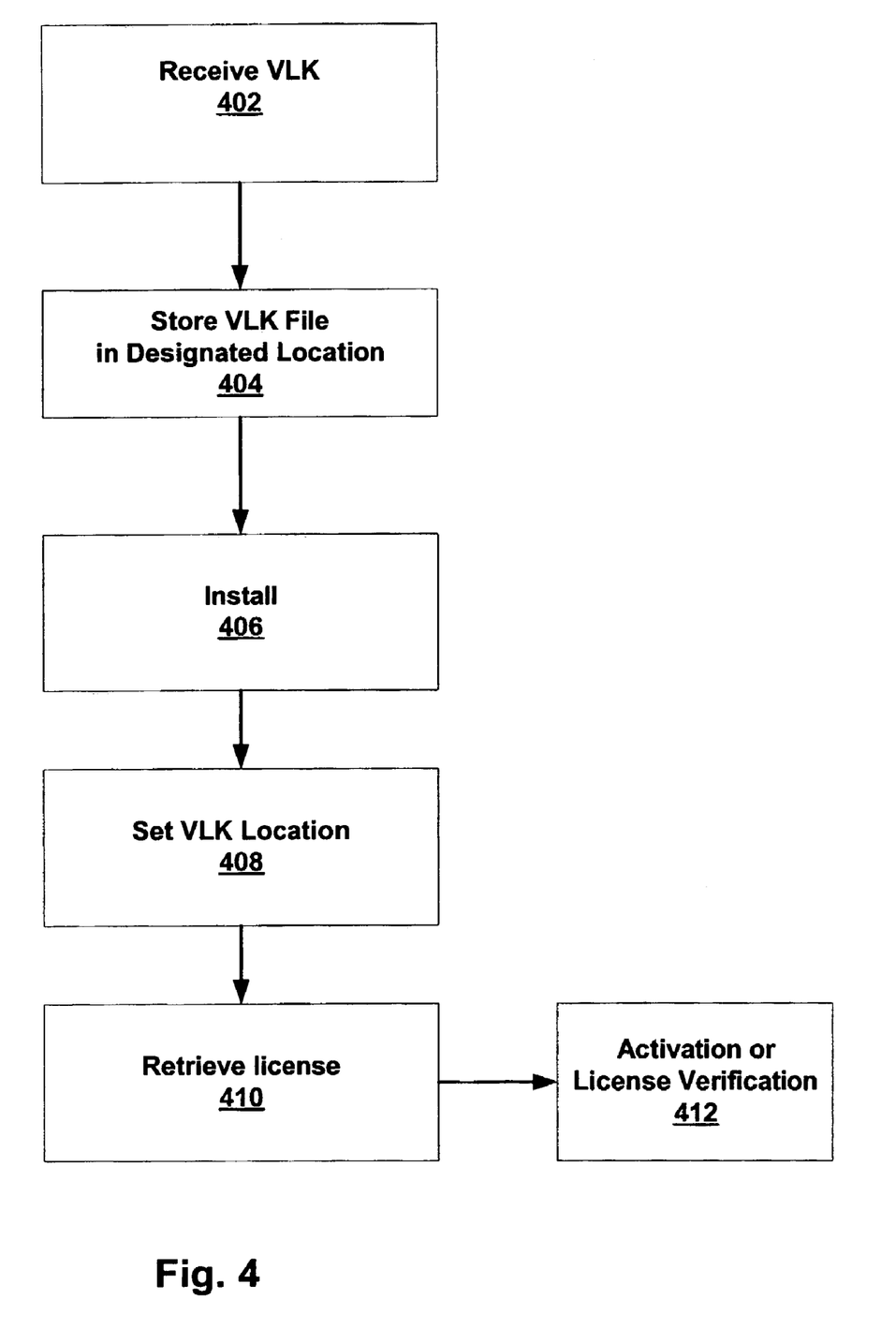
FIG. 4 is a flow diagram of an exemplary method for deterring software piracy in an environment-binding-enforced system in accordance with one embodiment of the present invention.

FIG. 4 is a flow diagram of a method of making software pirating more difficult in environment binding enforced system. At step 402, an enterprise-specific VLK and its associated license file are received. An installation image of the associated volume-licensed software may be prepared, for installation on one or more client machines. At step 404, the enterprise-specific or volume-license-holder-specific license file may be stored on a central server or deployed to client machines. The enterprise-specific or volume-license-holder-specific license file is not freely accessible to client machines associated with the server. A specialized script may be prepared that performs the unattended installation.

At step 406, the software is installed on the client machine or machines. At step 408, the script sets the location of the license file in a list of known locations in the system, either as deployed on the client machine(s) or by publishing the locations of the license file to client machine(s), e.g., via windows management interface (WMI) or via a hardcoded registry key. At step 410, upon logon, an activation routine retrieves the location of the license file. In the case of the license file being on a remote server, the script may optionally verify the location of the license file, e.g., by comparing Internet Protocol (IP) addresses. At step 412, the activation routine reads the data from the license file, verifies that the data is authentic, verifies the environment characteristics specified in the license file, and activates the software. If the environment characteristics specified in the license file cannot be verified while the system is connected, the system will continue to function in the grace period. Beyond the grace period, the system may function in the reduced functionality mode or the end user may request an extension from software vendor. If the license data cannot be verified while the system is disconnected, the software will continue to be functional only with disconnected features until the system joins a network again.

It is noted that the foregoing examples have been provided merely for the purpose of explanation and are in no way to be construed as limiting of the present invention. It is also noted that there are a variety of ways of implementing the present invention, e.g., an appropriate API, tool kit, driver code, operating system, control, standalone or downloadable software object, etc. which enables applications and services to obtain licensing information according to the invention. The invention contemplates the use of the invention from the standpoint of an API (or other software object), as well as from a software or hardware object that communicates in connection with a VLK licensing technique as described herein. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to deter piracy. Thus, the techniques for encoding/decoding data in accordance with the present invention may be applied to a variety of applications and devices. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. With respect to embodiments referring to the use of a control for achieving the invention, the invention is not limited to the provision of a .NET control, but rather should be thought of in the broader context of any piece of software (and/ore hardware) that achieves the piracy deterrent objectives in accordance with the invention.

One of ordinary skill in the art will appreciate that there are numerous ways of providing object code and nomenclature that achieves the same, similar or equivalent functionality achieved by the various embodiments of the invention. The invention may be implemented in connection with an on-line auction or bidding site as well.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the piracy deterrent techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method of deterring software piracy in a volume license environment, comprising:
   receiving an enterprise-specific volume license key embedded within an enterprise-specific volume license file, said volume license key adapted for use in activating an associated software application on a plurality of computing systems;
   authenticating the enterprise-specific volume license file;
   activating the software package associated with the volume license key on a first computing device; and
   activating the software package associated with the volume license key on a second computing device.

2. A method as recited in claim 1, wherein the enterprise-specific volume license key and enterprise-specific volume license file are associated with the software package for installation on a plurality of computing devices.

3. A method as recited in claim 2, further comprising installing the software package on the first computing device and the second computing device.

4. The method of claim 3, wherein installing the software package is performed using a script file for unattended installation.

5. The method of claim 4, wherein the volume license key and its associated volume license file specified in the script file allow for a grace period.

6. The method of claim 5, wherein the system continues to be fully functional within the grace period if the first computing device and the second computing device are connected online and the license data cannot be verified.

7. The method of claim 6, wherein the system functions in reduced functionality mode outside of the grace period if the first computing device and the second computing device are connected online and license data cannot be verified.

8. A method as recited in claim 2, further comprising storing the location of the enterprise-specific volume license file on at least one of the first or second computing device.

9. The method of claim 2, wherein the file comprises greater than 1.5 Megabytes.

10. The method of claim 4, wherein the script file sets a plain text volume license key in the registry of at least one of the first or second computing device.

11. The method of claim 10, wherein the plain text volume license key alone cannot be used to activate the software package.

12. The method of claim 5, wherein an end user may request signed extension for grace period if license data cannot be verified and the first computing device and the second computing device are connected to the Internet.

13. A method as recited in claim 1, further comprising storing the enterprise-specific volume license file in a central location.

14. The method of claim 13, wherein the central location is on a server.

15. The method of claim 13, wherein the central location is protected from direct access by a user of at least one of the first or second computing device.

16. The method of claim 1, wherein the enterprise-specific volume license file comprises data derived from a file in which the enterprise-specific volume license key is randomly embedded.

17. The method of claim 1, wherein the enterprise-specific volume license file is signed with a private key.

18. The method of claim 1, wherein the enterprise-specific volume license file is provided on a first CD ROM.

19. The method of claim 18, wherein the first CD ROM contains only the enterprise-specific volume license file.

20. The method of claim 18, wherein the first CD ROM containing the enterprise-specific volume license file is associated with a first volume label.

21. The method of claim 20, wherein the software package is provided on a second CD ROM associated with a second volume label and the first volume label is different than the second volume label.

22. The method of claim 1, wherein the enterprise-specific volume license file is on the same CD ROM as the software package.

23. The method of claim 1, wherein the enterprise-specific volume license file is generated by the enterprise, not the software vendor.

24. The method of claim 23, wherein the enterprise receives a specific VLK from the software vendor.

25. The method of claim 23, wherein the enterprise generates the license using at least one software vendor supplied hardware device.

26. The method of claim 25, wherein the hardware device is capable of asymmetric key generation and digital signature operation.

27. The method claim 1, wherein the system is fully functional if the license data cannot be verified and the machine is not connected online.

28. A computer readable storage medium comprising computer executable instructions for carrying out the method of claim 1.

29. A system for deterring software piracy comprising:
- a software package associated with an enterprise-specific volume license key embedded within an enterprise-specific volume license file;
- a first computing device for storing the enterprise-specific volume license file;
- a second computing device for running the software package;
- an activation routine for activating the software package on the second computing device in response to authenticating the enterprise-specific volume license file;
- a third computing device for running the software package; and
- an activation routine for activating the software package on the third computing device in response to authenticating the enterprise-specific volume license file.

30. The system of claim 29, wherein the first computing device and the second computing device are the same computing device.

31. The system of claim 29, wherein the enterprise-specific volume license file comprises data derived from a file in which the enterprise-specific volume license key is randomly embedded.

32. The system of claim 29, wherein the enterprise-specific volume license file comprises data derived from enterprise submitted computing environment characteristics and/or information about the enterprise's identity and products.

33. The system of claim 32, wherein the file may comprise greater than 1.5 Megabytes.

* * * * *